US011997387B2

(12) United States Patent
Jota (10) Patent No.: US 11,997,387 B2
(45) Date of Patent: May 28, 2024

(54) IMAGE BLUR CORRECTION APPARATUS, CONTROL METHOD THEREOF, AND STORAGE MEDIUM

(71) Applicant: CANON KABUSHIKI KAISHA, Tokyo (JP)

(72) Inventor: Yusuke Jota, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/816,491

(22) Filed: Aug. 1, 2022

(65) Prior Publication Data

US 2023/0049191 A1 Feb. 16, 2023

(30) Foreign Application Priority Data

Aug. 16, 2021 (JP) ................................ 2021-132359

(51) Int. Cl.
  *H04N 23/68* (2023.01)
  *H04N 23/667* (2023.01)
(52) U.S. Cl.
  CPC ......... *H04N 23/687* (2023.01); *H04N 23/667* (2023.01); *H04N 23/6812* (2023.01)
(58) Field of Classification Search
  CPC .. H04N 23/667; H04N 23/68; H04N 23/6812; H04N 23/682; H04N 23/685; H04N 23/686; H04N 23/687
  See application file for complete search history.

(56) References Cited

U.S. PATENT DOCUMENTS

| 2015/0042827 A1* | 2/2015 | Noguchi .............. H04N 23/667 |
| | | 348/208.2 |
| 2019/0098191 A1* | 3/2019 | Enke ...................... H04N 23/60 |

FOREIGN PATENT DOCUMENTS

| JP | 2001100106 A | 4/2001 |
| JP | 2003172961 A | 6/2003 |
| JP | 2010-139694 A | 6/2010 |
| JP | 2017134190 A | 8/2017 |
| JP | 2020003665 A | 1/2020 |
| WO | 2013021728 A | 2/2013 |
| WO | 2016030926 A | 3/2016 |

OTHER PUBLICATIONS

The above foreign patent documents were cited in the Jan. 5, 2024 Japanese Office Action, that issued in Japanese Patent Application No. 2021-132359.

* cited by examiner

*Primary Examiner* — Daniel M Pasiewicz
(74) *Attorney, Agent, or Firm* — Cowan, Liebowitz & Latman, P.C.

(57) ABSTRACT

An image blur correction apparatus comprises a calculation unit configured to calculate a movement amount of a moving device configured to move an image of a subject on an imaging plane, an acquisition unit configured to acquire information of a position of the moving device, a control unit configured to control movement of the moving device, and a selection unit configured to select either to cause the control unit to perform the control by a first image blur correction mode, or to perform the control by a second image blur correction mode in which the position variation amount of the moving device associated with the change of acceleration applied to the apparatus becomes smaller than the first image blur correction mode.

13 Claims, 5 Drawing Sheets

IMAGE BLUR CORRECTION APPARATUS, CONTROL METHOD THEREOF, AND STORAGE MEDIUM

BACKGROUND OF THE INVENTION

Field of the Invention

The present invention relates to an image blur correction apparatus used in an imaging apparatus.

Description of the Related Art

Recently, many imaging apparatuses such as digital cameras and video cameras have an image blur correction function installed therein to correct shake or the like applied to the imaging apparatuses. The image blur correction function makes it possible to capture images with a better image quality.

However, shooting a movie while walking with an imaging apparatus held in a hand may apply a large vibration to the imaging apparatus, which may exceed the driving range of an image blur correction member such as a shift lens.

Japanese Patent Laid-Open No. 2010-139694 discloses a method of performing image blur correction control by expanding the driving range of the shift mechanism of the correction lens when a large vibration is applied to the imaging apparatus in a case such as shooting while walking. According to the method, it is possible to expand the correction angle of the shift mechanism to reduce image blur caused by a large shake occurred in a case such as shooting while walking.

An image blur correction mechanism in an imaging apparatus described above includes one that includes a shift mechanism of an imaging element for capturing an image of a subject, and reduces image blur by shifting the imaging element with respect to an optical axis of the imaging optical system.

In addition, when shooting a movie while walking, the shooting may be performed with an electric gimbal stabilizer (referred to as stabilizer in the following) attached to the imaging apparatus in order to reduce the shake of the imaging apparatus.

In the case of shooting while walking using the stabilizer, although a large vibration acceleration is applied to the entire imaging apparatus, the stabilizer suppresses the effect of the vibration applied to the imaging apparatus body. However, the problem as described below arises in a case where the imaging element is subjected to the acceleration similar to the imaging apparatus body, with the imaging element being held against the imaging apparatus body by using the shift mechanism as described above. Specifically, whereas the imaging device body does not vibrate owing to the effect of the stabilizer, only the imaging element may move relative to the imaging apparatus body, and blur in the video may occur.

The method disclosed in Japanese Patent Laid-Open No. 2010-139694 does not consider any measure for preventing the aforementioned image blur in a case where a stabilizer is attached.

SUMMARY OF THE INVENTION

The present invention, which has been made in view of the aforementioned problem, provides an image blur correction apparatus that can appropriately correct image blur even when shooting a movie while walking with a stabilizer attached to the imaging apparatus.

According to a first aspect of the present invention, there is provided an image blur correction apparatus comprising: at least one processor or circuit configured to function as: a calculation unit configured to calculate a movement amount of a moving device configured to move an image of a subject on an imaging plane of an imaging element, in order to correct image blur due to shake of an apparatus, an acquisition unit configured to acquire information of a position of the moving device, a control unit configured to control movement of the moving device, based on information of the movement amount of the moving device and information of the position of the moving device, and a selection unit configured to select either to cause the control unit to perform the control by a first image blur correction mode, or to perform the control by a second image blur correction mode in which the position variation amount of the moving device associated with the change of acceleration applied to the apparatus becomes smaller than the first image blur correction mode.

According to a second aspect of the present invention, there is provided a method of controlling an image blur correction apparatus comprising: calculating a movement amount of a moving device configured to move an image of a subject on an imaging plane of an imaging element, in order to correct image blur due to shake of an apparatus; acquiring information of a position of the moving device; controlling movement of the moving device, based on information of the movement amount of the moving device and information of the position of the moving device; and selecting either to cause the controlling to perform the control by a first image blur correction mode, or to perform the control by a second image blur correction mode in which the position variation amount of the moving device associated with the change of acceleration applied to the apparatus becomes smaller than the first image blur correction mode.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
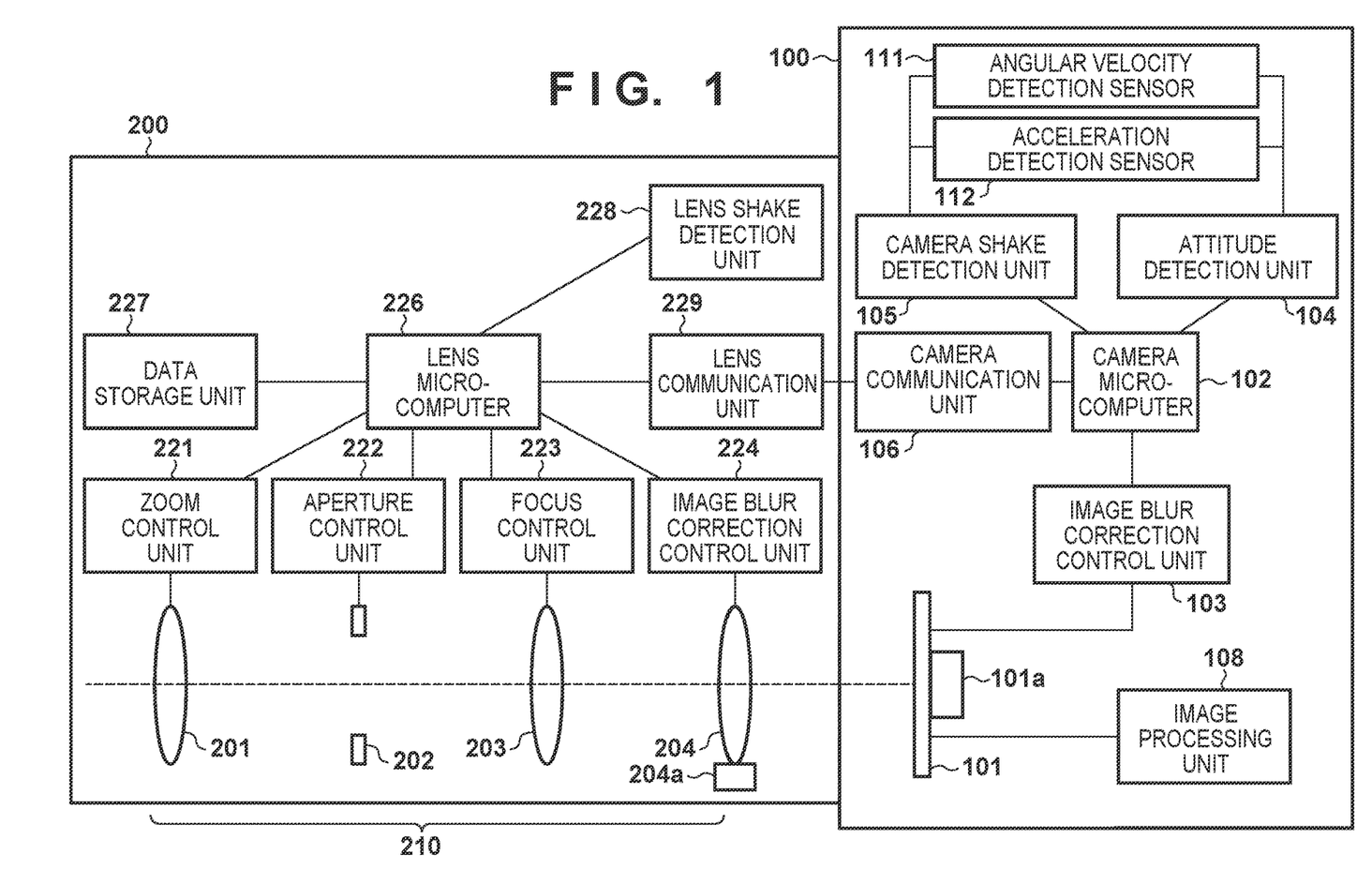
FIG. 1 is a schematic block diagram illustrating a configuration of an imaging system according to a first embodiment of the present invention.

FIG. 1 is a schematic block diagram illustrating a configuration of an imaging system according to a first embodiment of the present invention. The imaging system includes a camera body 100 and an interchangeable lens apparatus (referred to as "interchangeable lens", in the following) 200 that is detachable to the camera body 100. The camera body 100 may be a still camera or a video camera. In addition, although a system including an interchangeable lens detachably attached to the camera body is described in the present embodiment, the present invention is applicable to an imaging apparatus in which a camera and a lens are integrated.

In the camera body 100, an imaging element 101 captures (photoelectrically converts) an image of a subject formed by an imaging optical system 210 included in the interchangeable lens 200. An output signal (imaging signal) from the imaging element 101 is input to an image processing unit 108. The image processing unit 108 performs various image processing on the imaging signal to generates image data. The image data may be displayed on a monitor (not illustrated) or recorded in a recording medium (not illustrated).

The imaging element 101 can be moved by a shift mechanism 101a in a direction intersecting with an optical axis OP of the imaging optical system 210. For example, it can be shifted in a plane perpendicular to the optical axis OP, or rotated in a plane perpendicular to the optical axis OP with an axis parallel to the optical axis OP being the center of rotation. In the following, description is provided, focusing on a case of shifting the imaging element 101.

A camera shake detection unit 105 detects a shake (referred to as "camera shake" in the following), which is the movement of the camera body 100 caused by the user's hand shake or the like, and outputs a camera shake detection signal representing the camera shake to a camera microcomputer 102. The camera shake detection unit 105 generates a camera shake detection signal using the detection result of an angular velocity detection sensor 111 and an acceleration detection sensor 112. The camera microcomputer 102 has a function as a control unit configured to control movement of the imaging element 101. The camera microcomputer 102 calculates, from the camera shake detection signal, a shift amount (movement amount) of the imaging element 101 for reducing (correcting) image blur caused by camera shake, and outputs an image blur correction instruction including the shift amount to an image blur correction control unit 103. The image blur correction control unit 103 controls the actuator included in a shift mechanism 101a in accordance with the image blur correction instruction from the camera microcomputer 102, to shift-drive the imaging element 101 by the aforementioned shift amount. As a result, the image of the subject is moved on the imaging plane of the imaging element 101 to perform image blur correction by the shift of the image sensor 101.

The camera microcomputer 102 instructs an attitude detection unit 104 to detect an attitude of the camera body 100 (hereinafter referred to as "camera attitude"), and the attitude detection unit 104 detects the attitude of the camera and outputs an attitude detection signal to the camera microcomputer 102. The attitude of the camera includes normal position, vertical position (grip-up, grip-down), upward, or the like. The attitude detection unit 104 detects the camera attitude using the detection result of the angular velocity detection sensor 111 and the acceleration detection sensor 112. In addition, the camera microcomputer 102 can communicate with a lens microcomputer 226 via a camera communication unit 106 and a lens communication unit 229 provided in the interchangeable lens 200.

In the interchangeable lens 200, the imaging optical system 210 includes a zoom lens 201, an aperture 202, a focus lens 203, and an image blur correction lens (optical element) 204. A zoom control unit 221 can detect the position of the zoom lens 201 (referred to as "zoom position" in the following), and performs zooming by driving the zoom lens 201 in accordance with the zoom drive instruction from the camera microcomputer 102. The focus control unit 223 can detect the position of the focus lens 203 (referred to as "focus position" in the following), and performs focus adjustment by driving the focus lens 203 in accordance with the focus drive instruction from the camera microcomputer 102.

The aperture control unit 222 can detect the aperture diameter of the aperture 202 (referred to as "aperture position" in the following), and adjusts the light amount by driving the aperture 202 in accordance with an aperture drive instruction from the camera microcomputer 102. The aperture control unit 222 may detect and control the aperture position either continuously, or discontinuously such as open state, second level (intermediate), and first level (minimum). In addition, the aperture position may be detected using the drive amount of the drive mechanism that drives the aperture 202.

Subsequently, the zoom position, the aperture position, and the focus position respectively detected by the zoom control unit 221, the aperture control unit 222 and the focus control unit 223 are transmitted to the camera microcomputer 102. Here, the zoom position to be transmitted may be information of the position of the zoom lens 201, or information of the focal length corresponding to the zoom position.

The image blur correction lens 204, when performing image blur correction, can be shifted, by the shift mechanism 204a in a direction including a directional component perpendicular to the optical axis. In other words, the image blur correction lens 204 may be shifted in a plane perpendicular to the optical axis, or may pivot about a point on the optical axis being a pivot center.

The lens shake detection unit 228 detects a shake (referred to as "lens shake" in the following), which is a movement of the interchangeable lens 200 resulting from the user's hand shake or the like, and outputs a lens shake detection signal representing the lens shake to the lens microcomputer 226.

The lens microcomputer 226 calculates the shift amount of the image blur correction lens 204 for reducing (correcting) the image blur caused by the lens shake using the lens shake detection signal, and outputs the image blur correction instruction including the shift amount to the image blur correction control unit 224. The image blur correction control unit 224 controls the movement of the image blur correction lens 204 based on the image blur correction instruction from the lens microcomputer 226. Specifically, lens image blur correction is performed by controlling an actuator included in the shift mechanism 204a in accordance with the image blur correction instruction to drive the image blur correction lens 204 as much as the calculated amount of shift. The lens microcomputer 226 has a function as a transmission unit configured to read out information, stored in a data storage unit (storage unit) 227, such as image circle information described below, and transmit the image circle information or the like to the camera body 100.

The data storage unit 227 is storing optical information such as zoom range (variable range of the focal range) of the imaging optical system 210, focus range (focusable distance range), or variable range of aperture value. In addition, the data storage unit 227 is storing information related to the image circle of the imaging optical system 210 (referred to as "image circle information" in the following). Here, the image circle information includes information representing the position of the image circle and information representing the size of the image circle. In the present embodiment, the image circle center information representing the center position of the image circle is stored as the information representing the position of the image circle.

Shooting a movie while walking with the camera body 100 attached to an electric gimbal stabilizer (referred to as stabilizer in the following) causes an acceleration change of the camera body 100 in the direction of gravity (gravity direction) due to the impact of the photographer's steps. On this occasion, vibration of the camera body 100 is corrected by the stabilizer, and thus the camera body 100 hardly vibrates. In contrast, as the imaging element 101 is movably held against the camera body 100 with the shift mechanism 101a, a large change of acceleration being applied to the imaging element 101 in the gravity direction causes the position of the imaging element 101 to vary relative to the camera body 100. The variation tends to be seen as blur in the video, which may lead to a degraded quality of the captured video.

On the other hand, the aforementioned blur does not occur when the stabilizer is used with a mechanism being provided for fixing the image sensor 101 to the camera body 100 and the imaging element 101 being mechanically fixed to the camera body 100. However, providing the mechanism in the camera body 100 for mechanically fixing the imaging element 101 may increase the entire size of the camera body 100. In addition, fixing the imaging element 101 to the camera body 100 may prevent the imaging element 101 from performing the image blur correction operation. In such a case, the imaging element 101 is prevented from correcting the residual blur that is not completely corrected by the stabilizer, and thus the residual blur is visible in the video, which may lead to a degraded quality of the captured video.

Therefore, the present embodiment provides a first image blur correction mode and a second image blur correction mode in the image blur correction control unit 103. The image blur correction control unit 103 selects one of the image blur correction modes to be used for performing image blur correction control.

The first image blur correction mode is a mode for performing normal image blur correction control, and the second image blur correction mode is a mode for performing image blur correction control with the stabilizer attached. The first and the second image blur correction modes in the image blur correction control have different control parameters when performing position feedback control of the imaging element 101. In the second image blur correction mode, the control parameter for position feedback control of the image sensor 101 is set so that the position variation of the imaging element 101 caused by a change of acceleration applied to the camera body 100 becomes smaller compared to in the first image blur correction mode.

Figure 2:
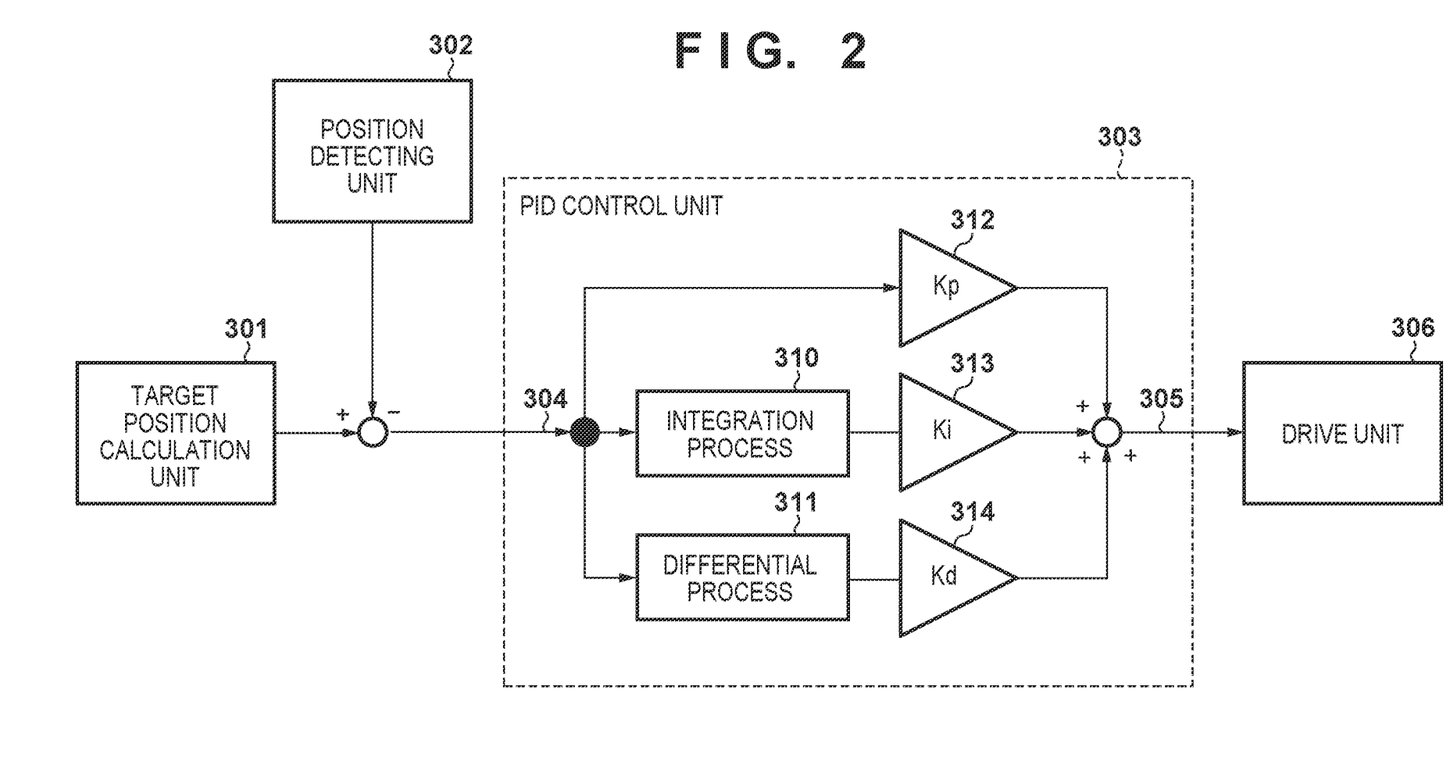
FIG. 2 illustrates a block configuration of a feedback control unit of an image blur correction control unit according to the first embodiment.

FIG. 2 illustrates a block configuration of a feedback control unit of the image blur correction control unit 103 according to the present embodiment. In the present embodiment, PID control is used for feedback control.

A target position calculation unit 301 calculates, from the camera shake detection signal output from the camera shake detection unit 105, a target position of the imaging element 101 for reducing image blur. A position detecting unit 302 detects (acquires) a current position (moving position) of the imaging element 101. In the present embodiment, a Hall element is used for the position detecting unit 302. A PID control unit 303 calculates a drive amount 305 of the imaging element 101 using, as an input, a deviation 304 indicating the difference between the output signals of the target position calculation unit 301 and the position detecting unit 302. A drive unit 306 drives the shift mechanism 101a of the imaging element 101 based on the drive amount 305 of the imaging element 101 output from the PID control unit 303.

The PID control unit 303 calculates the drive amount 305 by summing a signal output with multiplying the deviation 304 by a P-term gain Kp 312, a signal output with performing an integration process 310 on the deviation 304 and being multiplied by an I-term gain Ki 313, and a signal output with performing a differential process 311 on the deviation 304 and being multiplied by a D-term gain Kd 314.

In the present embodiment, the P-term gain Kp 312 of the PID control unit 303 of the imaging element 101 is set higher in the second image blur correction mode compared to in the first image blur correction mode. Setting the P-term gain Kp 312 high enhances the electrical spring effect in feedback control, making it possible to reduce the position variation amount of the imaging element 101 due to change of acceleration of the camera body 100.

Selection of image blur correction mode selecting either the first image blur correction mode or the second image blur correction mode may be manually selected by the user selecting by a menu operation of the camera body 100. Upon the user selecting the second image blur correction mode on the menu screen of the camera body 100 in a case where the user is shooting while walking with the camera body 100 attached to the stabilizer, the image blur correction control unit 103 performs an image blur correction control of the imaging element 101 according to the second image blur correction mode.

In the first embodiment, as has been described above, in a case of shooting a movie while walking with the stabilizer attached to the camera body 100, the electrical spring effect in feedback control of the shift drive of the imaging element 101 is enhances, and thus the imaging element 101 is made less likely to be moved by an impulsive acceleration. Accordingly, it is possible to prevent varying in the position of the imaging element 101 against the photographer's shooting intention, generation of blur in the image, and degrading a quality of a captured movie.

Although, in the first embodiment, PID control is used for feedback control of the imaging element 101 and the P-term gain Kp 312 is set higher in the second image blur correction mode compared to in the first image blur correction mode, the present invention is not limited thereto. In the second image blur correction mode, the I-term gain Ki 313 or the D-term gain Kd 314 of the PID control unit 303 may be set higher compared to in the first image blur correction mode. In addition, a plurality or all of the P-term gain Kp 312, the I-term gain Ki 313, and the D-term gain Kd 314 may be set high.

Additionally, setting the P-term gain Kp 312 and the D-term gain Kd 314 high increases a gain of the high-frequency band, and thus a stationary high-frequency noise is increased and high-frequency noise sound recorded in the captured movie is also increased. On the other hand, setting the I-term gain Ki 313 high increases the gain of the low-frequency band but does not increase the gain of the high-frequency band, and thus the stationary high-frequency noise does not change. Therefore, also the high frequency noise sound recorded in the captured movie does not change. The foregoing suggests that the gain of each term may be set higher in the second image blur correction mode compared to in the first image blur correction mode, and the amount of change of the I-term gain Ki 313 may be set larger compared to those of the P-term gain Kp 312 and the D-term gain Kd314. The foregoing allows for suppressing increase of high frequency noise recorded in the captured movie in the second image blur correction mode.

In addition, when PI control is used for feedback control, either the P-term gain or the I-term gain may be set high, or the gain of both terms may be set high in the second image blur correction mode. Additionally, from the aforementioned reason, gains of respective terms may be set higher in the second image blur correction mode compared to in the first correction mode, and also the amount of change of the I-term gain may be set larger compared to that of the P-term gain. The foregoing approach allows for suppressing worsening of the high-frequency noise recorded in the captured movie in the second image blur correction mode.

Setting the gain of the feedback control higher in the second image blur correction mode compared to in the first image blur correction mode allows for reducing the position variation of the imaging element 101 caused by failing to keep the imaging element 101 at the instructed position due to the change of acceleration of the camera body 100, and reducing blur in the captured movie.

Although the foregoing description has explained to differ the gains of feedback control between the first image blur correction mode and the second image blur correction mode, the control block configuration or the control filter characteristics for the feedback control may be different.

In addition, the foregoing description has explained about a case where the imaging element moves due to the impact of walking when the stabilizer is attached. On the other hand, the image blur correction lens in the interchangeable lens may move due to the impact of walking. Therefore, when shooting while walking, the control by the second image blur correction mode of the aforementioned imaging element may also be applied to the control of the image blur correction lens. The foregoing approach also allows for correcting the image blur due to the movement of the image blur correction lens.

Second Embodiment

Next, the second embodiment of the present invention will be described. In the second embodiment, the selection of the image blur correction mode described in the first embodiment will be described for a case where the imaging apparatus automatically determines the shooting condition. Here, the configuration of the imaging system is similar to that of the first embodiment, description thereof will be omitted, and only the difference in the operation will be described.

The image blur correction control unit 103 of the present embodiment automatically determines the shooting condition of the camera body 100 and selects the image blur correction mode. As an example, there will be described a case where the image blur correction control unit 103 automatically determines the shooting condition of the camera body 100 from information of the angular velocity detected by the angular velocity detection sensor 111 and information of the acceleration detected by the acceleration detection sensor 112, and selects the image blur correction mode. As with the first embodiment, when the second image blur correction mode is selected, the control parameter, in the image blur correction control unit 103, for position feedback control of the imaging element 101 is set to reduce the position variation amount of the imaging element 101 associated with the change of acceleration applied to the camera body 100.

Figure 3A:
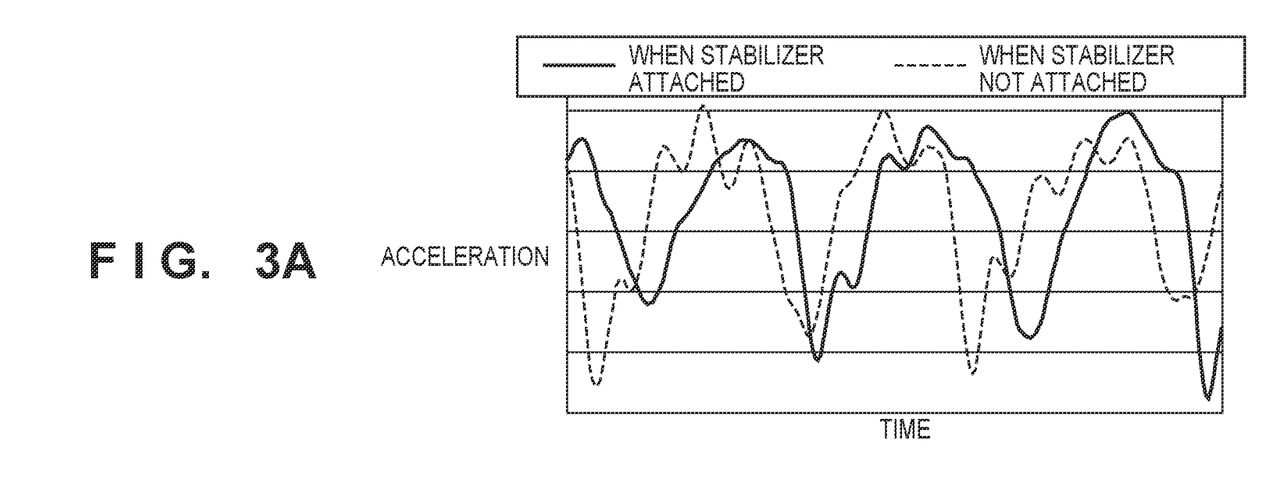
FIGS. 3A and 3B respectively illustrate a difference in output values of an acceleration sensor depending on a shooting scene.

FIG. 3A illustrates changes of acceleration in the gravity direction detected by the acceleration detection sensor 112 when shooting a movie while walking with the stabilizer attached to the camera body 100 and when shooting a movie with the stabilizer not attached. Comparing the case of shooting a movie while walking with the stabilizer attached to the camera body 100 and the case of shooting a movie with the stabilizer not attached, no large difference can be observed between changes of acceleration applied to the camera body 100 in the gravity direction.

Figure 3B:
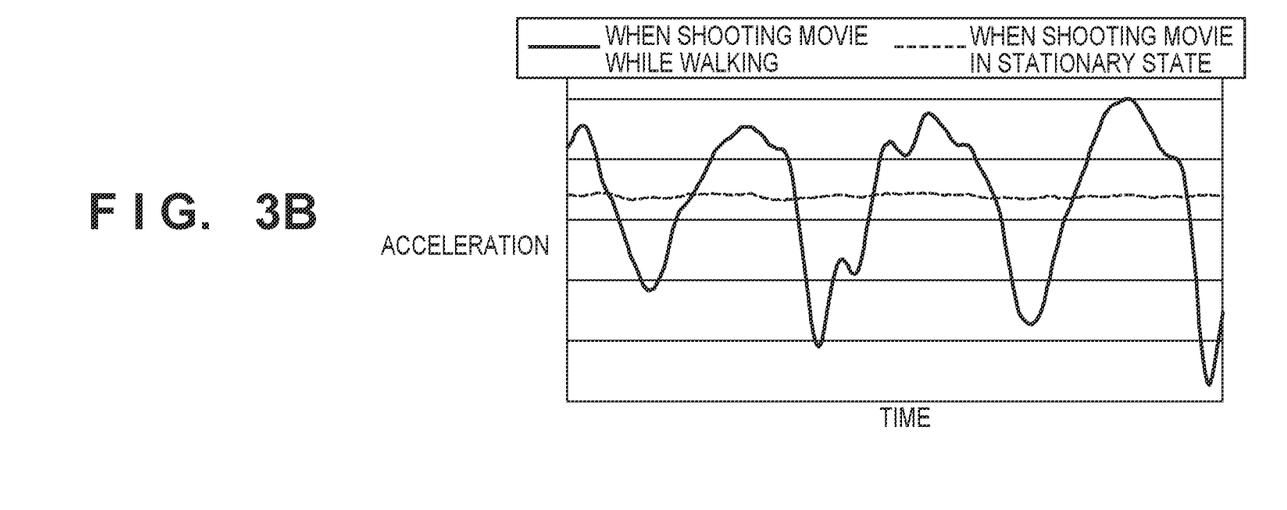

Next, FIG. 3B illustrates changes of acceleration in the gravity direction when shooting a movie in a stationary state and when shooting a movie while walking, with the stabilizer attached to the camera body 100 in both cases. It can be seen that the change of acceleration in the gravity direction is larger when shooting a movie while walking compared to when shooting a movie in a stationary state. This is because a change of acceleration on the camera body 100 occurs in the gravity direction due to impact of landing of the photographer when shooting a movie while walking.

Figure 4:
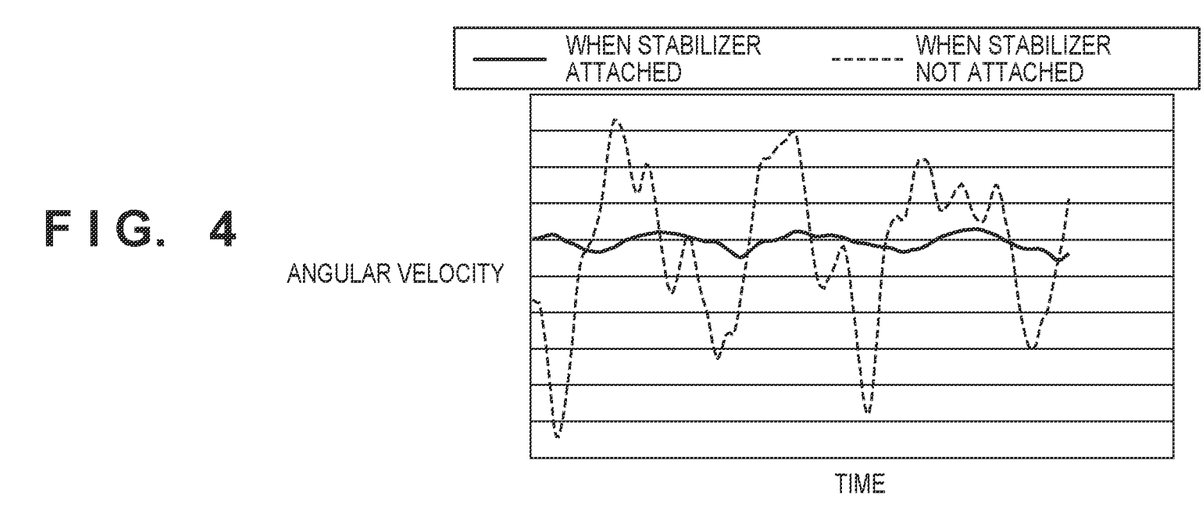
FIG. 4 illustrates a difference in output values of an angular velocity sensor depending on the shooting scene.

FIG. 4 illustrates changes of the angular velocity in the gravity direction (angular velocity in the pitching direction of the camera) for the case of shooting a movie while walking with the stabilizer attached to the camera body 100 and the case of shooting a movie while walking with the stabilizer not attached. It can be seen that the change of angular velocity in the gravity direction when shooting a movie with the stabilizer attached to the camera body 100 is relatively smaller compared to when shooting a movie with the stabilizer not attached. This is because the stabilizer operates to detect a change of angular velocity applied to the camera body 100 and cancel the change.

From the results illustrated in FIGS. 3A, 3B and 4, FIG. 5 illustrates a relative relation between the acceleration and the angular velocity applied to the camera body 100 in the gravity direction for the case of shooting a movie in a stationary state and the case of shooting a movie while walking, with the stabilizer attached to the camera body 100 in both cases. It can be seen from FIG. 5 that, in the case of shooting a movie while waking with the stabilizer attached to the camera body 100, the change of angular velocity in the gravity direction is relatively small, and the change of acceleration in the gravity direction is relatively large (satisfying a predetermined condition).

Figure 5:
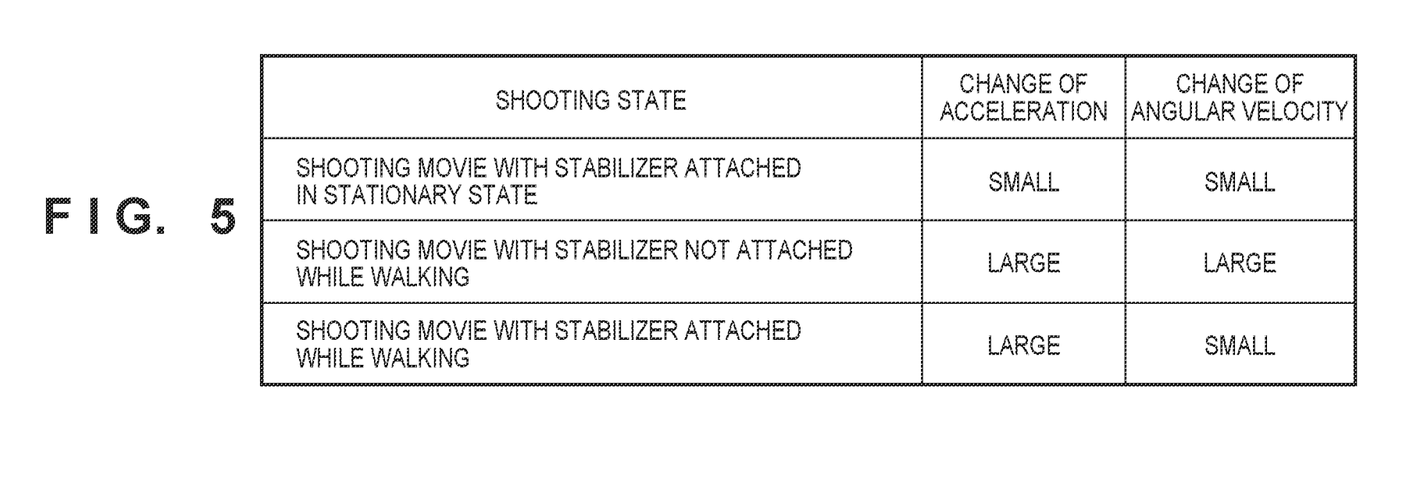
FIG. 5 illustrates a relative difference between output values of an acceleration sensor and an angular velocity sensor depending on the shooting scene.

Using the result illustrated in FIG. 5, it is determined whether or not shooting a movie while walking is being performed with the stabilizer attached to the camera body 100. In other words, it is determined that shooting a movie while walking is being performed with the camera body 100 attached to the stabilizer when the change of angular velocity applied to the camera body 100 in the gravity direction is small and the change of acceleration applied to the camera body 100 in the gravity direction is large. In such a case, the image blur correction control unit 103 selects the second image blur correction mode and performs image blur correction control to reduce the positional variation amount of the imaging element 101 associated with the change of acceleration applied to the camera body 100 in the gravity direction.

Figure 6:
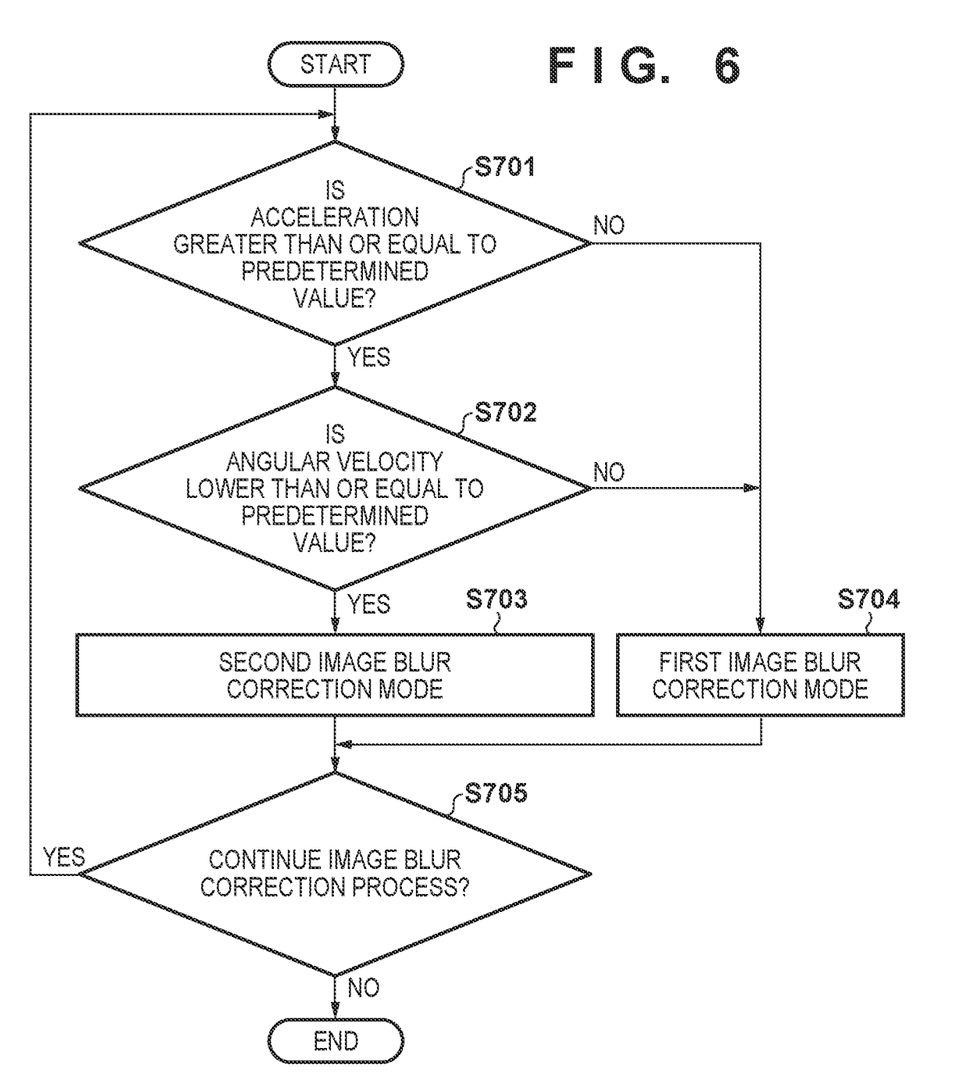
FIG. 6 is a flowchart illustrating a selection process of an image blur correction mode according to a second embodiment.

FIG. 6 is a flowchart illustrating an operation of the image blur correction control unit 103 for determining the image blur correction mode in the second embodiment.

When the power source of the camera body 100 is turned ON and image blur correction control is started by the image blur correction control unit 103, the process proceeds to step S701.

At step S701, the image blur correction control unit 103 determines whether or not the acceleration in the gravity direction detected by the acceleration detection sensor 112 has reached or exceeded a predetermined value (threshold value). When it is determined that the acceleration has reached or exceeded the predetermined value, the process proceeds to step S702, otherwise the process proceeds to step S704.

At step S702, the image blur correction control unit 103 determines whether or not the angular velocity in the gravity direction detected by the angular velocity detection sensor 111 is equal to or lower than a predetermined value (equal to or lower than a threshold value). When the angular velocity in the gravity direction is determined to be equal to or lower than a predetermined value, the process proceeds to step S703, otherwise the process proceeds to step S704.

At step S703, the image blur correction control unit 103 determines that the camera body 100 is attached to the stabilizer and shooting a movie while walking is being performed, and therefore selects the second image blur correction mode and proceeds to step S705.

At step S704, on the other hand, the image blur correction control unit 103 does not determine that the camera body 100 is attached to the stabilizer and shooting a movie while walking is being performed, and therefore selects the first image blur correction mode and proceeds to step S705.

At step S705, the image blur correction control unit 103 determines whether or not to continue the image blur correction process and, in a case where the image blur correction process is to be continued, returns to step S701. When, on the other hand, the image blur correction process is to be terminated, the process of the flow is terminated.

According to the second embodiment as has been described above, the image blur correction control unit 103 can automatically select the image blur correction mode in accordance with the shooting state, in addition to the effect similar to that of the first embodiment. As a result, unlike the first embodiment, the image blur correction control unit 103 can select the appropriate image blur correction mode in accordance with the shooting condition to suppress degradation of the quality of the captured video, without the photographer being required to select the image blur correction mode.

Note that, although the image blur correction mode is selected from information on both the acceleration and the angular velocity in the gravity direction in the second embodiment, it is not necessary to determine the image blur correction mode from both pieces of information. The image blur correction mode may be selected by determining the shooting state only from the information of the acceleration in the gravity direction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-132359, filed Aug. 16, 2021, which is hereby incorporated by reference herein in its entirety.

What is claimed is:

1. An image blur correction apparatus comprising:
at least one processor or circuit configured to function as:
a calculation unit configured to calculate a movement amount of a moving device configured to move an image of a subject on an imaging plane of an imaging element, in order to correct image blur due to shake of an apparatus,
an acquisition unit configured to acquire information of a position of the moving device,
a control unit configured to control movement of the moving device, based on information of the movement amount of the moving device and information of the position of the moving device, and
a selection unit configured to select either to cause the control unit to perform the control by a first image blur correction mode, or to perform the control by a second image blur correction mode in which the position variation amount of the moving device associated with the change of acceleration applied to the apparatus becomes smaller than the first image blur correction mode,
wherein in the control, the movement of the moving device is controlled based on a difference signal between the information of the movement amount and information of the position, and
a feedback gain for the same difference signal in the control is set higher in the second image blur correction mode than in the first image blur correction mode.

2. The image blur correction apparatus according to claim 1, wherein the selection unit selects the control by the second image blur correction mode in a case where a suppression device that suppresses shake is attached outside the apparatus.

3. The image blur correction apparatus according to claim 2, wherein the suppression device is an electric gimbal stabilizer.

4. The image blur correction apparatus according to claim 1, wherein the moving device is a device configured to move an imaging element in a direction intersecting an optical axis.

5. The image blur correction apparatus according to claim 1, wherein the moving device is a device configured to move, in a direction intersecting an optical axis, an image blur correction lens provided in an imaging optical system.

6. The image blur correction apparatus according to claim 1, wherein a configuration of control blocks of the control or characteristics of a control filter of the second image blur correction mode is different compared to that of the first image blur correction mode.

7. The image blur correction apparatus according to claim 1, wherein the control is PID control or PI control.

8. The image blur correction apparatus according to claim 1, wherein the selection unit selects the control according to the second image blur correction mode in a case where angular velocity and acceleration of a shake of the apparatus satisfy a predetermined condition.

9. The image blur correction apparatus according to claim 8, wherein the selection unit selects the control according to the second image blur correction mode in a case where angular velocity in the gravity direction and acceleration in the gravity direction of a shake of the apparatus satisfy a predetermined condition.

10. The image blur correction apparatus according to claim 9, wherein the selection unit selects the control according to the second image blur correction mode in a case where the angular velocity in the gravity direction is equal to or lower than a first threshold value and the acceleration in the gravity direction is equal to or larger than a second threshold value.

11. The image blur correction apparatus according to claim 1, wherein the selection unit is a unit configured for a user to manually select the first image blur correction mode or the second image blur correction mode.

12. A method of controlling an image blur correction apparatus comprising:
calculating a movement amount of a moving device configured to move an image of a subject on an imaging plane of an imaging element, in order to correct image blur due to shake of an apparatus;
acquiring information of a position of the moving device;
controlling movement of the moving device, based on information of the movement amount of the moving device and information of the position of the moving device; and
selecting either to cause the controlling to perform the control by a first image blur correction mode, or to perform the control by a second image blur correction mode in which the position variation amount of the moving device associated with the change of acceleration applied to the apparatus becomes smaller than the first image blur correction mode,
wherein in the control, the movement of the moving device is controlled based on a difference signal between the information of the movement amount and information of the position, and
a feedback gain for the same difference signal in the control is set higher in the second image blur correction mode than in the first image blur correction mode.

13. A non-transitory computer-readable storage medium storing a program for causing a computer to execute respective steps of a control method of an image blur correction apparatus, the method comprising:
calculating a movement amount of a moving device configured to move an image of a subject on an imaging plane of an imaging element, in order to correct image blur due to shake of an apparatus;
acquiring information of a position of the moving device;
controlling movement of the moving device, based on information of the movement amount of the moving device and information of the position of the moving device; and
selecting either to cause the controlling to perform the control by a first image blur correction mode, or to perform the control by a second image blur correction mode in which the position variation amount of the moving device associated with the change of acceleration applied to the apparatus becomes smaller than the first image blur correction mode,
wherein in the control, the movement of the moving device is controlled based on a difference signal between the information of the movement amount and information of the position, and
a feedback gain for the same difference signal in the control is set higher in the second image blur correction mode than in the first image blur correction mode.

* * * * *